(12) United States Patent
Wendling et al.

(10) Patent No.: US 6,253,692 B1
(45) Date of Patent: Jul. 3, 2001

(54) ROW CLEANER SUSPENSION

(75) Inventors: Ignatz Wendling, Bettendorf, IA (US); Luc Janelle, Colona; Lyle Eugene Stephens, Hampton, both of IL (US); Detlef Jüptner, Kleinblittersdorf (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/489,089

(22) Filed: Jan. 21, 2000

(30) Foreign Application Priority Data

Feb. 24, 1999 (DE) .............................................. 199 07 788

(51) Int. Cl.[7] ...................................................... A01C 5/06
(52) U.S. Cl. .............................................................. 111/139
(58) Field of Search ................................... 111/79, 73, 80, 111/62, 139, 140, 141, 143, 142, 157, 52, 151; 172/624.5, 307, 484, 551, 705, 166

(56) References Cited

U.S. PATENT DOCUMENTS

| | | |
|---|---|---|
| 3,797,418 | 3/1974 | Bridger, Jr. .............................. 111/73 |
| 4,580,507 | 4/1986 | Dreyer et al. ........................... 111/73 |
| 4,834,189 | 5/1989 | Peterson et al. ....................... 172/166 |
| 5,065,681 | 11/1991 | Hadley .................................... 111/55 |
| 5,341,754 | 8/1994 | Winterton ............................ 111/139 |
| 5,461,995 | 10/1995 | Winterton ............................ 111/139 |
| 5,657,707 | 8/1997 | Dresher et al. ...................... 111/139 |
| 5,878,678 | 3/1999 | Stephens et al. .................... 111/139 |

FOREIGN PATENT DOCUMENTS

| | | |
|---|---|---|
| 567 228 | 11/1987 | (AU) . |
| 0 764 397 | 3/1997 | (EP) . |

*Primary Examiner*—Robert E. Pezzuto

(57) ABSTRACT

A row cleaner device for a furrow forming row unit includes a support arrangement with a parallel linkage having a single acting hydraulic cylinder connected between upper and lower links. The cylinder extension is controlled by a hydraulic circuit to provide adjustable down pressure to maintain consistent operation of the cleaner devices in varying ground conditions. A tensioning device such as a spring extending generally parallel to the cylinder acts to retract the cylinder. A blocking valve can be closed to maintain the cleaner device in the raised position and can lock the cylinder in any desired extended position. An energy storage device such as a spring compressed between the cylinder and one of the links permits limited vertical movement of the linkage without change of cylinder extension to protect the device and accommodate obstacles and ground surface irregularities in the path when the cylinder is locked in position. The cylinder can be controlled as a function of the position of the opener, and, can be controlled to raise the cleaner device automatically with raising of the row units. The row cleaner can be supported in various positions and can be controlled remotely. The cleaner can be conveniently raised to the non-operating position to avoid undesirable ground contact.

17 Claims, 3 Drawing Sheets

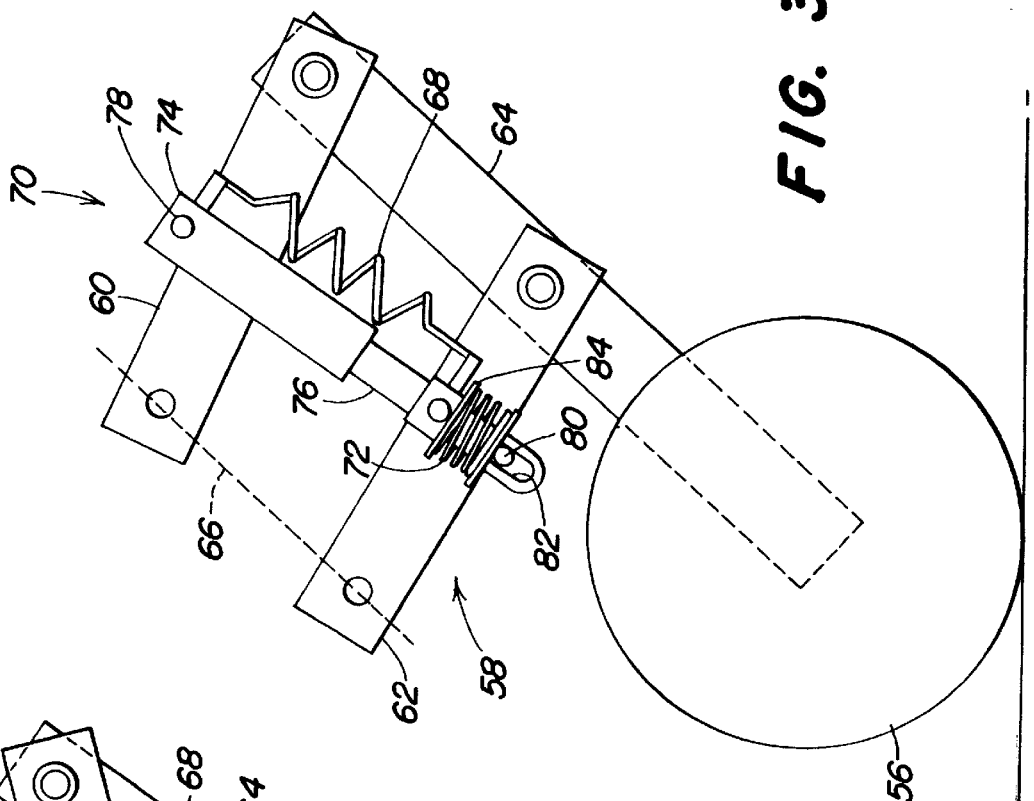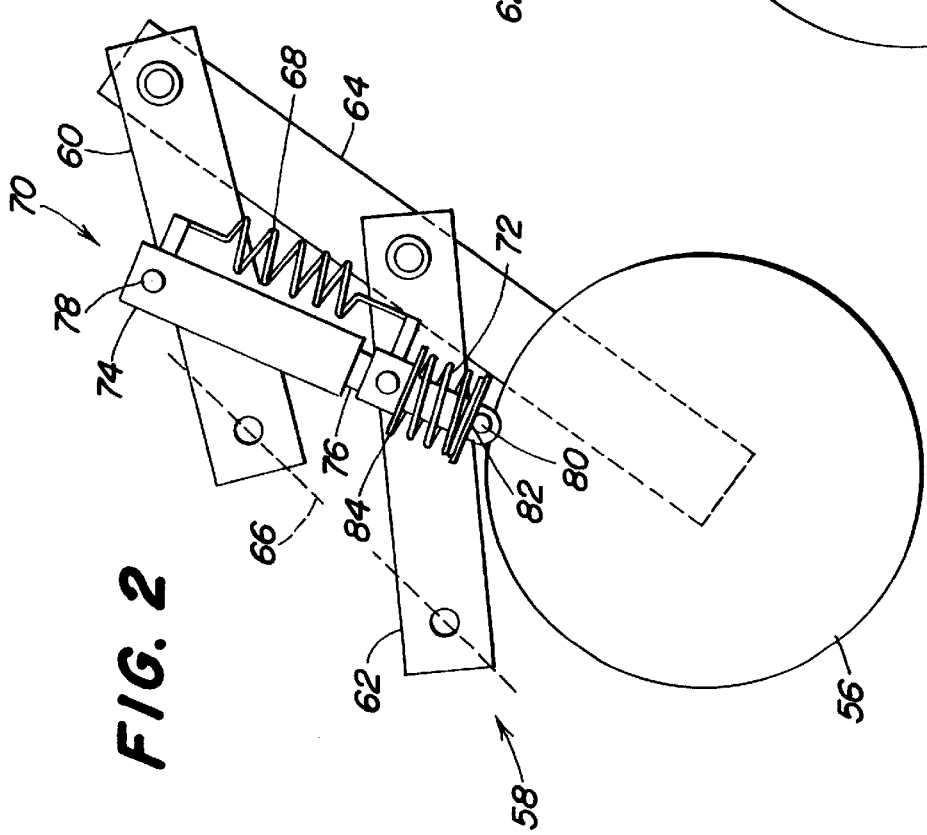

ROW CLEANER SUSPENSION

BACKGROUND OF THE INVENTION

1) Field of the Invention

The present invention relates generally to a row cleaner for an opener on an agricultural implement, and more specifically, to a linkage for supporting the row cleaner.

2) Related Art

Row units for grain drills of the type shown in U.S. Pat. No. 5,341,754 include a forwardly located row cleaner device for clearing material such as straw, weeds, stubble and other debris from the row line in the path of an opener to facilitate formation of a furrow. Each row cleaner includes two converging disks pivotally connected to the frame by a parallel linkage including upper and lower links that allow the cleaner to pivot vertically. A spring extends between opposite corners of the links to provide a constant down pressure of the wheels against the ground.

One problem with such a cleaner device is that the cleaner wheels are always in contact with the ground during field-working operations unless the operator manually removes the device or locks the device in a raised position. Also, when the implement row units are raised to the transport position, the cleaner wheels tend to drop to the lowermost position and the offset between the wheels and the ground is very small so that undesirable ground contact during transport and during turns in the field is common. The previous row cleaning devices have also lacked a down pressure adjustment that is easy to operate. Presently, changing down pressure requires individual time-consuming adjustment or replacement of springs on the linkages.

BRIEF SUMMARY OF THE INVENTION

It is therefore an object of the present invention to provide an improved row cleaner device that overcomes most or all of the aforementioned problems. It is a further object to provide such an improved device which provides adjustable down pressure and which facilitates independent raising and lowering of the cleaner between transport and ground-engaging positions. It is yet another object to provide such a device which follows irregular ground surface well.

It is a further object of the present invention to provide an improved row cleaner device for an agricultural implement with adjustable down pressure and lift functions. It is a further object to provide such a device which is remotely operable and which can be adjusted and moved quickly and easily and can be operated automatically with other lift or down pressure systems on the systems for optimum positioning in the field and during transport. It is another object to provide such a device which can be secured in various operating positions, and which can be conveniently locked in a raised transport position when ground contact is to be avoided. It is yet another object of the invention to provide such a device which includes protective cushioning for reducing impact loading, particularly when the device is secured in an operating position.

A row cleaner device includes a support arrangement with a parallel linkage having a single acting hydraulic cylinder or other suitable servo motor connected between the upper and lower links. The cylinder extension is conveniently controlled by a hydraulic circuit to provide adjustable down pressure to maintain consistent operation of the cleaner devices in varying ground conditions. A tensioning device such as a spring extending generally parallel to the cylinder acts to retract the cylinder. The hydraulic circuit not only provides adjustable down pressure but also can be controlled by a blocking valve to maintain the cleaner device in the raised position and can lock the cylinder in any desired extended position. An energy storage device such as a spring or rubber bumper compressed between the cylinder and one of the links permits limited vertical movement of the linkage without change of cylinder extension to protect the device and accommodate obstacles and ground surface irregularities in the path when the cylinder is locked in position. The cylinder can be controlled as a function of the position of the opener, and, in the embodiment shown, raises the cleaner device automatically with raising of the row units. The row cleaner can be supported in various positions and can be controlled remotely. The cleaner can be conveniently raised to the non-operating position to maintain a substantial distance from the ground or road surface to avoid undesirable contact.

These and other objects, features and advantages of the present invention will become apparent to one skilled in the art upon reading the following detailed description in view of the drawings.

BRIEF DESCRIPTION OF THE DRAWINGS

FIG. 2 shows a schematic side view of the row cleaner in a raised position

FIG. 3 shows a schematic side view of the row cleaner in a lowered position.

DETAILED DESCRIPTION OF THE DRAWINGS

Figure 1:
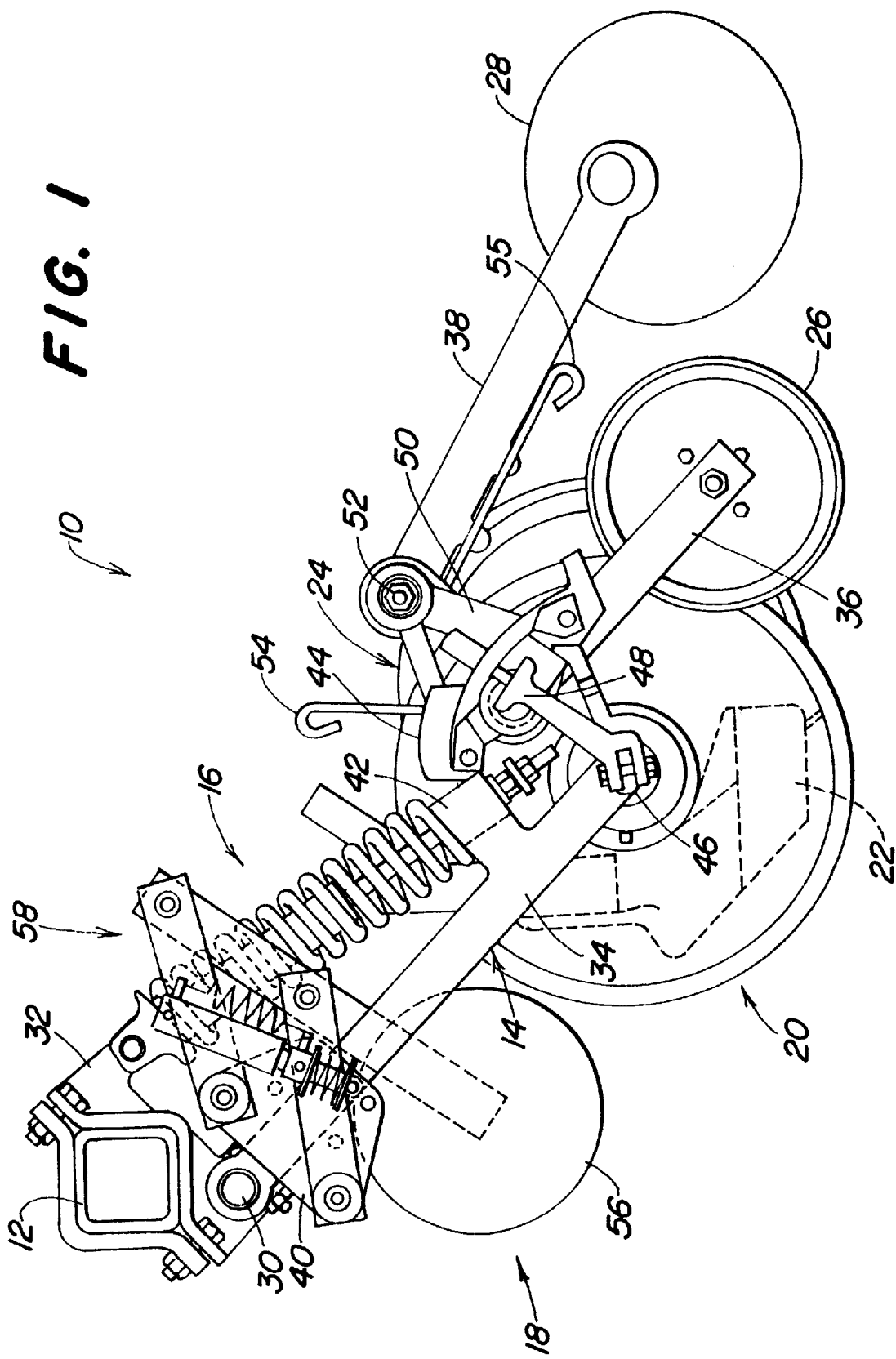
FIG. 1 shows a side view of a seed drill with a row cleaner.

Referring now to FIG. 1, therein is shown a row unit or grain drill opener 10 of a seed drill, not shown in its entirety, configured for no-till operation. The unit 10 is fastened to a transverse tubular frame or support 12 and includes a support arm 14, a down pressure spring arrangement 16, a row cleaner 18, a furrow opener 20, a seed boot 22, a height adjustment wheel 24, a firming or contact pressure wheel 26 and a closing wheel 28. The unit 10 typically is one of several such units on a seed drill and is used to insert seed into the ground as it is towed over a field by an agricultural tractor, not shown. In fields where no-till and minimum till methods are practiced, the ground has not been prepared so crop residue, stubble and the like have not been worked into the ground but are located on the ground surface.

Figure 4:
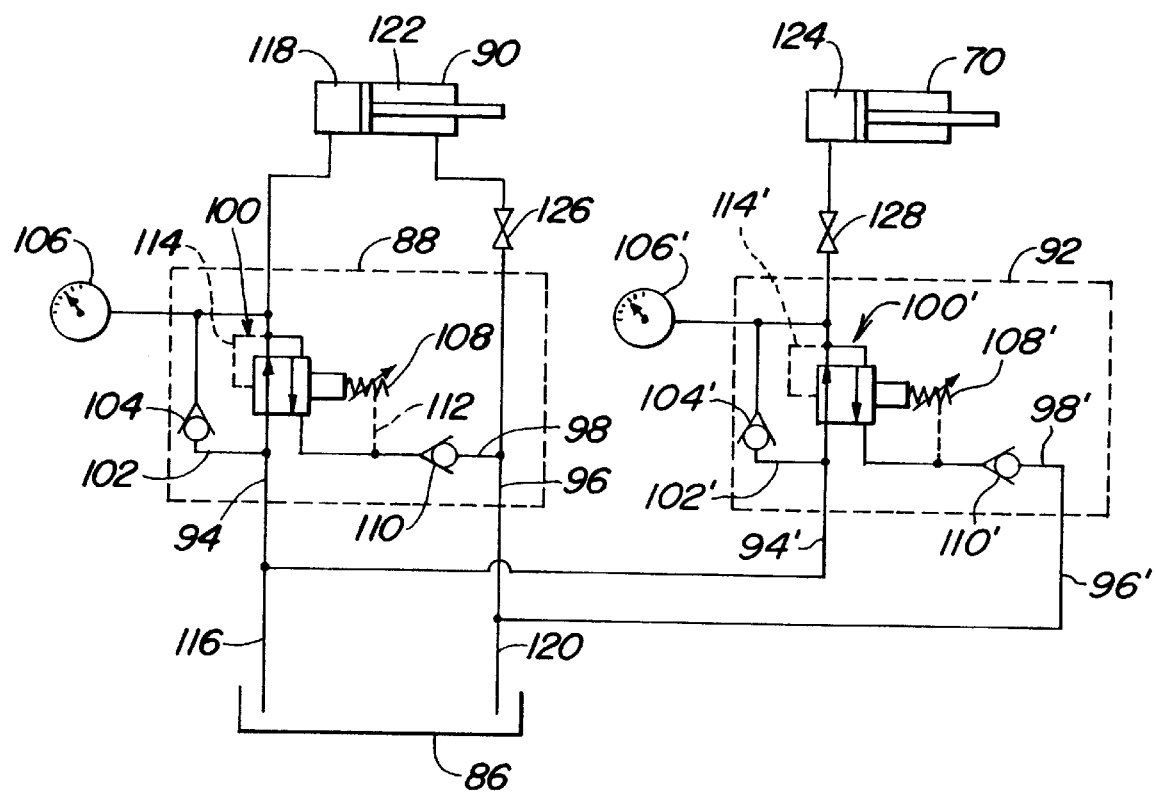
FIG. 4 shows a hydraulic circuit for the operation of the row cleaner.

One or more row units 10 are fastened to the support 12 which extends in a direction transverse to the forward direction of operation of the seed drill and is either coupled to the agricultural tractor, towed by it or carried by it. The support, as a rule, is a four-sided tube that is resistant to bending. By means of lifting and lowering devices, not shown, the transverse support 12 and with attached units 10 can be raised or lowered relative to the ground. A servo motor or cylinder 90, shown in FIG. 4, is provided between the support 12 and the main frame of the implement for this purpose.

The support arm 14 is connected by a bearing 30 and bracket 32 to the transverse support 12 for pivoting vertically about a transverse axis. The support arm 14 includes a front arm or section 34, a central arm or section 36 and a rear arm or section 38. The central section 36 and the rear section 38 are pivotally connected by bearings to the front section 34 so the sections 36 and 38 can pivot to follow uneven ground.

The bracket or mount 40 for the row cleaner 18 is located immediately behind the connection of the front section 34 with the bearing 30. Immediately above the aft end of the section 34 a spring abutment and support member 42 is provided for the spring arrangement 16. A connection 44 for the central section 36 is also located above the aft end. A bearing 46 supports the furrow opener 20 from the lower aft end of the section 34.

The central section 36 includes an upper forward end connected by a bearing 48 to the connection 44 for vertical pivoting of the section 36. The lower aft end of the section 36 rotatably supports the wheel 26. A leg or branch 50 extends upwardly adjacent the central section 36 and supports a bearing 52. The forward end of the section 38 is pivotally connected to the unit by the bearing 52 for rocking vertically, and the aft end of the section 38 rotatably supports the wheel 28.

The spring arrangement 16, shown as a helical downpressure spring, is compressed between the bracket 32 on the frame 12 and the member 42 on the section 34 and encircles a conventional spring guide and downstop limit. A second downpressure spring 54 is adjustably supported between the connection 44 and the section 36. A third adjustable downpressure spring 55 is connected to the rear section 38.

The row cleaner 18 includes a cleaner disk 56 and a four bar linkage suspension 58. The cleaner disk 56 is shown as a circular disk, but actually contains a wave-shaped or toothed edge region similar to a bread knife or a chain sprocket or gear. The task of the cleaner disk 56 clears crop residue or other objects lying on the ground from the path of the furrow opener 20 so the opener can form a clean furrow. Decaying material, which could affect the germination process of the seed crop, is therefore prevented from reaching the furrow. Under certain circumstances the cleaner disk 56 should not engage the ground, for example, during transport of the unit 10. Also, during operation of the implement in certain conditions including loose ground conditions, it is desirable to avoid ground engagement in order to prevent furrowing of the soil by the unit 10.

The four bar linkage suspension 58 allows the disk 56 to move vertically relative to the remainder of the unit 10. The suspension 58 includes upper and lower links or steering arms 60 and 62 and front and rear links or steering arms 64 and 66 configured and arranged in the form of a parallelogram linkage. A tensioning arrangement 68, servo motor or cylinder 70 and a resilient device or energy storage device 72 are provided generally between the upper and lower links 60 and 62. The upper and the lower steering arms 60, 62 are identical or generally identical and diverge slightly with respect to each other. The forward ends of the arms 60, 62 are pivotally connected to the front steering arm 66 and the aft ends are pivotally connected to the rear steering arm 64 so the arms can freely pivot. The arm 64 extends below the pivotal connection with the lower arm 62 and rotatably supports the cleaner disk 56. The front arm 66 is defined by the mount 40 and is fixed with respect to the frame 12. Conventional bearings (not shown) provide the pivotal connections that permit a vertical pivoting of the suspension 58.

The tensioning arrangement 68 is shown as a coil spring with ends connected to the servo motor or cylinder 70 to bias the upper and lower arms 62, 64 towards each other. As shown, the motor 70 is a hydraulic cylinder having a housing 74 with a piston or actuator 76 controlled by a hydraulic circuit shown in FIG. 4. The cylinder 70 is extended by application of hydraulic pressure and is retracted by the tensioning arrangement 68. The base end of the cylinder 70 is pivotally connected by a pin 78 to the upper arm 60. The rod end of the cylinder or actuator 76 is pivotally connected by a pin 80 to the lower arm 62. If the cylinder 70 is extended (FIG. 3) the four bar linkage suspension 58 assumes the extended or lowered condition. Removing hydraulic pressure from the cylinder 70 causes the coil spring at 68 to move the linkage to a closed or raised position (FIG. 2).

The actuator 76 includes a free end region having a slot 82 which receives and guides the pin 80 in the direction of the longitudinal axis of the cylinder 70. A stop 84 is axially fixed at the upper end of the slot 82 and is configured as a disk which contact a pin extending diametrically through the actuator 76. An energy storage or resilient device 72 is supported between the pin 82 and the stop 84 and is preferably partially compressed to provide a preload. As shown, the device 72 is a coil spring biasing the pin 80 into contact with the lower end of the slot 82. The above described arrangement of the device 72, pin 80, slot 82 and stop 84 allows the four bar linkage suspension 58 to move to a certain extent while the cylinder itself remains rigid. The slot 82 and the stop 84 can also be combined in a separate component or assembly that encloses the device 72 and is mounted on and connected to the actuator 76. If desired, a disk can be provided between the pin 80 and the energy storage device 72 for improved guidance of the device 72. The energy storage device 72 biases the cleaner into contact with the ground and reduces vibration and wear by preventing free pin movement in the slot.

The furrow opener 20 (FIG. 1) is configured as a disk with a smooth edge region but which is domed and which is rotatably carried by the section 34. The opener is slightly inclined relative to the direction of operation and follows the cleaner disk 56. The seed boot 22 is connected through a seed tube (not shown) to a hopper for receiving seed and depositing the seed in the furrow. The seed boot 22 is located generally under the opener hub in the shadow of the opener. The boot 22 moves vertically with the furrow opener 20. The height control wheel 24 is adjustable vertically with respect to the opener 20 and moves with the opener as it rolls on the edge region of the furrow.

The firming wheel 26 located at the rear of the section 36 rolls in the furrow region to press newly deposited seed in place for good seed germination and growth. The closing wheel 28 is supported at the rear of the section 38 and is slightly inclined to the longitudinal direction of the furrow so that soil is pressed into the furrow from the side after the seed is deposited in the furrow.

Referring now to FIG. 4, therein is shown the hydraulic circuit for operating the cylinder 90 to move the row units 10 up and down and for providing separate adjustment of the row cleaners 18. The circuit includes a conventional double-acting control valve shown generally at 86 located on the towing vehicle. A valve 88 is connected to the valve 86 and to the cylinder 90 for controlling the row units 10. A valve 92 is connected to the row cleaner cylinders 70 for controlling cleaner position and down pressure.

The furrow opener valve 88 includes first and second passages 94 and 96 connected by a channel 98, a check valve 110 and a pressure relief valve 100. The first passage 94 extends through the pressure relief valve 100 parallel to a bypass 102 which bypasses the valve 100. A check valve 104 opens in the direction from the base end 118 of the cylinder 90 to the control valve 86. A pressure gauge 106 is connected to the bypass 102 between the check valve 104 and the base end 118 of the cylinder 90.

The pressure relief valve 100 is configured with a pressure control or adjustable spring arrangement 108 so that opening pressure can be controlled. The channel 98 extends through a check valve 110 and the pressure relief valve 100.

A pilot line 112 branches from the channel 98 at a location between the check valve 110 and the pressure relief valve 100 and opens into the side of the pressure relief valve 100 that is loaded by the spring 108. Another pilot line 114 opening into the pressure relief valve 100 on the side opposite the spring 108 is connected to the line 94 leading to the base end 118 of the cylinder 122. Depending on the pressures and forces applied, the pressure relief valve 100 assumes either a first position in which the base end of the cylinder is pressurized or a second position wherein the base end of the cylinder is connected to the channel 98.

The inlet side of the first passage 94 of the furrow opener valve 88 is connected via line 116 to the control valve 86. The outlet side of the passage 94 is connected to the base end 118. The inlet side of the passage 96 of the valve 88 is connected via line 120 to the control valve 86. The outlet side of the passage 96 is connected to the rod end 122 of the cylinder 90 through a remotely controllable blocking valve 126.

The row cleaner valve 92 is configured generally identically to the furrow opener valve 88 (numbered elements on the valve 92 corresponding to those on the valve 88 are indicated with a prime) with the exception of the absence of the connection of the line 96 for the rod end of the controlled cylinder. A single acting cylinder 70 is shown rather than the double acting cylinder 90 for the row unit control. The inlet side of first passage 94' of the row cleaner valve 92 is connected through the line 116 to the control valve 86. The outlet side of the passage 94' is connected to base end 124 of the cylinder 70. The inlet side of the second passage 96' is connected through the line 120 to the control valve 86. The second passage 96' is connected within the valve 92 to the channel 98'. A remotely operable blocking valve 128 is connected between the outlet of the line 94' and the base end 124 of the cylinder 70.

The suspension 58 moves the disk 56 between a raised position (FIG. 2) and a lowered position (FIG. 3). In order to lower the disk 56, the servo motor or cylinder 70 is extended by supplying pressurized fluid to the first line 116 by means of the control valve 86. This fluid is then conducted on through the first passage 94' of the row cleaner valve unit 92 and the blocking valve 128, now opened, into the base end 124 of the cylinder 70. The actuator 76 extends against the bias of the tensioning device 68 to extend the parallelogram linkage and cause the disk 56 to be supported on the ground. Depending on the unevenness of the ground encountered, after the disk 56 makes contact with the ground and further pressurized fluid is supplied, then the device 72 is compressed, whereupon the pin 80 moves in the slot 82. The contact pressure of the cleaner disk 56 is indicated on the pressure gauge 106' of the row cleaner valve unit 92 and can be adjusted at the control 108' of the pressure relief valve 100'. The force with which the row cleaner operates, cuts or removes crop lying on the ground can be controlled in accordance the current ground conditions by varying the operating pressure applied to the cylinder 70 at the control 108'. If pressure rises above the selected level, the spool of the pressure relief valve 100' moves (to the right as shown in FIG. 4) to allow fluid at the base end 124 to return to reservoir through the line 120 via valve 100', check valve 110' and passage 96'. If pressure drops below the selected level, the valve 100' moves (to the left as shown) to supply fluid pressure from the line 116 via passage 94' and valve 100' through the blocking valve 128 to the base end 124 to increase pressure. The cleaners can independently follow the ground contour and accommodate irregular surface conditions while maintaining a generally constant down pressure. If the cylinder 70 is to remain in a selected position, the blocking valve 128 is closed.

Depending upon which of the lines 116, 120 is pressurized or not pressurized, the lowering of the disk 56 or the suspension 58 can be performed in the following manner. When pressure is supplied to the first line 116, the pressure relief valve 100' of the row cleaner valve unit 92 is actuated remotely, for example, by means of an electromagnetic valve, to bring it into a position in which a connection is established between the rod end 124 over the first passage 94', the pressure relief valve 100' and the check valve 110' to the second line 120 and finally to a non-pressurized reservoir, not shown. In this situation the tensioning device 68 will draw the actuator 76 into the housing 74 and thereby raise the disk 56.

If there is no pressure in the first line 116 and the tensioning device 68 operates when the blocking valve 128 is opened, the fluid that is present in the piston end chamber 124 of the servo motor 70 can drain through the check valve 104', the first line 116', and the control valve 86 into the reservoir. Even if the first line 116 is not pressurized and the second line 120 carries pressure, the aforementioned flow and drainage of the fluid operates as described. In this situation the control valve 86 will supply pressurized fluid to the second line 120, which reaches the rod end 122 of the cylinder 90 and retracts the actuator 76. Due to the check valve 110' in the row cleaner valve unit 92, however, the pressurized fluid cannot reach the piston end chamber 124. With the blocking valve 128 open and the line 116 returned to sump, fluid flow via the valve 128, valve 104' and passage 94' allows the cylinder 70 will retract under the tension of the spring 68 to raise the cleaner.

It is possible to control the hydraulic circuit in such a way that both cylinders 70 and 90 can be extended or retracted independently of each other. The present embodiment as shown, however, assures the cylinder 70 is retracted when the cylinder 90 is retracted to avoid the situation in which the disks 56 are in a lowered position although the furrow openers 20 are in their raised position. The linkage 58 is attached to the mount 40 and moves with the mount as the section 36 pivots. To maintain the cylinder 70 in its retracted position when the cylinder 90 is again extended, the blocking valve 128 is closed.

The tensioning arrangement 68 may be configured as a compression or extension spring, as a weight, as a gas spring or the like. Also the servo motor 70 may be configured as a single acting or double acting cylinder.

The energy storage device 72, if provided between one of the links and the servo motor 70, may be configured as a rubber bumper, a compression or extension spring, or a gas spring or other resilient device so that the impacts due to uneven ground are not fully applied to the servo motor. The impacts against the servo motor are further reduced by the fact that the link applies a load to the servo motor through the resilient device over the range of motion of the resilient device, which in the embodiment shown includes a compression spring and a lost motion pin and slot connection. The compression spring or other resilient device may be selectively preloaded, and the preload can be adjusted to accommodate different field operating conditions. The connection of the resilient device can be configured in various ways, for example, by means of slots, levers and stops and the like.

For convenience and ease of manufacturing, the tensioning arrangement 68 is manufactured and sold as a unit with the servo motor 70. The tensioning arrangement can also be arranged on the outside of the housing as shown or in the interior of a housing to avoid dirt accumulation and prevent damage.

Having described the preferred embodiment, it will become apparent that various modifications can be made without departing from the scope of the invention as defined in the accompanying claims.

What is claimed is:

1. A suspension arrangement for adjustably supporting an agricultural row cleaner adjacent row unit structure which is movable vertically by an implement lift system, the suspension comprising:
   a row cleaner support linkage having first and second ends;
   mounting structure pivotally supporting the first end of the support linkage for vertical movement relative to the row unit;
   connecting structure connecting the second end of the support linkage to the row cleaner;
   an operable motor connected to the linkage for pivoting the linkage to raise and lower the row cleaner relative to the ground and to bias the row cleaner into ground engagement; and
   a control connected to the motor and including a down pressure adjustment for operating the motor to automatically maintain a preselected bias of the row cleaner relative to the ground.

2. The suspension arrangement set forth in claim 1 wherein the control is responsive to the movement of the row unit structure vertically to automatically move the row cleaner from the ground engagement when the row unit structure is raised.

3. The suspension arrangement set forth in claim 1 including an energy storage device connected between the motor and the linkage and permitting limited movement of the support linkage without operation of the motor.

4. The suspension arrangement set forth in claim 1 wherein the control includes a blocking member for securing the motor in a preselected condition and blocking operation of the motor to maintain the row cleaner in a preselected position.

5. The suspension arrangement set forth in claim 1 wherein the motor is a single acting motor for moving the row cleaner in one vertical direction, and further including a tensioning device connected to the support linkage biasing the row cleaner in the opposite vertical direction.

6. The suspension arrangement set forth in claim 5 wherein the motor moves the row cleaner downwardly into a ground engaging position against the bias of the tensioning device.

7. The suspension arrangement set forth in claim 5 wherein the motor comprises a single acting cylinder and the tensioning device includes a tension spring connected in parallel with the cylinder.

8. The suspension arrangement set forth in claim 1 wherein the motor comprises a hydraulic cylinder, and the control includes an adjustable pressure responsive valve.

9. The suspension arrangement set forth in claim 8 wherein the control further comprises a blocking valve for selectively maintaining the hydraulic cylinder in a preselected condition.

10. The suspension arrangement set forth in claim 1 wherein the motor comprises a hydraulic cylinder having a range of extended and retracted positions, wherein the cylinder is pressurized to bias the row cleaner into ground contact, and further including a tension member acting against the bias of the cylinder and tending to lift the row cleaner out of ground contact.

11. The suspension arrangement set forth in claim 10 further including a blocking valve for maintaining the cylinder in a preselected extended or retracted position.

12. The suspension arrangement set forth in claim 11 including a resilient member connected between the cylinder and the linkage and providing limited vertical movement of the row cleaner when the cylinder is maintained in a preselected position.

13. The suspension arrangement set forth in claim 10 wherein the control comprises an adjustable pressure responsive valve connected to the cylinder.

14. The suspension arrangement set forth in claim 10 wherein when pressure is removed from the cylinder, the tension member will raise the row cleaner from the ground.

15. The suspension arrangement set forth in claim 14 wherein the control is responsive to vertical movement of the lift system to remove pressure from the cylinder when the lift system is raised.

16. The suspension arrangement set forth in claim 1 wherein the support linkage comprises a four bar linkage with upper and lower links and wherein the motor is connected between the links, and further including a tensioning member connected between the links to raise the row cleaner when the motor is in an inoperable condition.

17. The suspension arrangement set forth in claim 16 wherein the motor comprises a hydraulic cylinder and the tensioning member comprises a spring connected between the links.

* * * * *